United States Patent [19]

Okada et al.

[11] Patent Number: 4,888,865
[45] Date of Patent: Dec. 26, 1989

[54] MACHINE TOOL

[75] Inventors: Eiichi Okada; Akira Ozawa; Tomomi Kousaka, all of Saitama; Hirokazu Ohba, Shizuoka, all of Japan

[73] Assignee: Honda Giken Kogyo Kabushiki Kaisha, Tokyo, Japan

[21] Appl. No.: 168,945

[22] Filed: Mar. 16, 1988

[30] Foreign Application Priority Data

Mar. 16, 1987 [JP] Japan .................................. 62-60584
Apr. 6, 1987 [JP] Japan .................................. 62-84303

[51] Int. Cl.$^4$ ........................ B23C 1/027; B23Q 3/157
[52] U.S. Cl. ....................................... 29/568; 409/211; 409/231
[58] Field of Search ............... 29/26 A, 568; 409/190, 409/201, 204, 211, 216, 231

[56] References Cited

U.S. PATENT DOCUMENTS

| | | | |
|---|---|---|---|
| 2,227,410 | 12/1940 | Johnson | 409/211 |
| 2,472,345 | 6/1949 | Schaublin-Villeneuve | 409/211 |
| 3,359,861 | 12/1967 | Johnson et al. | 409/216 |
| 3,690,220 | 9/1972 | Escobedo | 409/211 |
| 3,803,680 | 4/1974 | Kuhnert | 408/35 |
| 4,329,770 | 5/1982 | Kielma | 29/568 |
| 4,557,645 | 12/1985 | Marsland | 409/211 |

FOREIGN PATENT DOCUMENTS

| | | | |
|---|---|---|---|
| 33187 | 3/1977 | Japan | 29/26 A |
| 60-44101 | 10/1985 | Japan . | |
| 1095233 | 1/1965 | United Kingdom . | |
| 1152042 | 5/1965 | United Kingdom . | |
| 1124312 | 10/1965 | United Kingdom . | |
| 1149931 | 7/1966 | United Kingdom . | |
| 1344306 | 11/1971 | United Kingdom . | |
| 1554627 | 4/1978 | United Kingdom . | |

Primary Examiner—Daniel Howell
Attorney, Agent, or Firm—Birch, Stewart, Kolasch & Birch

[57] ABSTRACT

A machine tool includes a first movable base movable in a horizontal plane in a first direction, a second movable base mounted on the first movable base and movable toward and away from a workpiece in the horizontal plane in a second direction transverse to the first direction, a support base mounted on the movable base, and a spindle stock supported on the support base and rotatable about a center in a vertical plane. A spindle device is mounted on an outer end of the spindle stock at a position off the center. The spindle stock may be an arm rotatable about a longitudinal center thereof, or substantially disc-shaped. The support base has an annular support member disposed on a front surface thereof coaxially with the center, the spindle stock includes a slidable member held in slidable contact with the annular support member.

7 Claims, 11 Drawing Sheets

FIG. 7
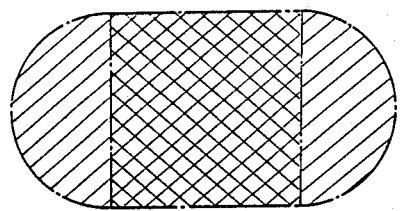
AREA MACHINED BY INVENTIVE MACHINE TOOL
AREA MACHINED BY CONVENTIONAL MACHINE TOOL
FIG. 8
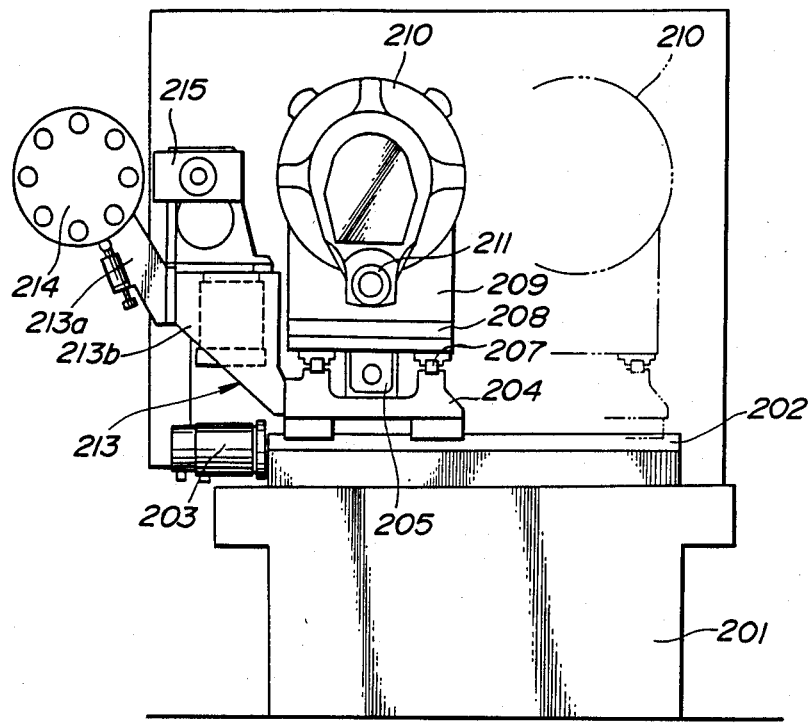

MACHINE TOOL

BACKGROUND OF THE INVENTION

1. Field of the Invention:

The present invention relates to a machine tool, and more particularly to a machine tool for use as a tapping machine, a drilling machine, or the like.

2. Description of the Relevant Art:

One known machine tool having a spindle device for use as a tapping machine or a drilling machine to machine a workpiece is disclosed in Japanese Patent Publication No. 60-44101 published Oct. 1, 1985 (claiming Convention priority under U.S. Patent Application No. 142625 filed April 22, 1980, now U.S. Pat. No. 4,384,397).

The disclosed machine tool includes a cross-slide table movable transversely and a feed table mounted on the cross-slide table and movable in a direction normal to the direction in which the cross-slide table is movable, i.e., a direction toward and away from a workpiece. Vertical guide rails are mounted on the feed table, and a vertically movable spindle table is mounted on the guide rails, with a spindle device installed on the spindle table. The spindle device is positionally adjustable with respect to a position where the workpiece is to be machined, by moving the above various tables.

In the above disclosed machine tool, the three tables are movable linearly in two horizontal directions and one vertical direction for varying the position of the spindle device three-dimensionally.

The vertically movable spindle table engages the vertical guide tables which project upwardly from the spindle table. A drive motor and a cylinder unit for vertically moving the spindle table are disposed above the guide rails. The conventional machine tool of such a construction is of necessity large in outer profile, particularly vertical dimensions thereof, and has its center of gravity at a high position.

SUMMARY OF THE INVENTION

According to the present invention, there is provided a machine tool comprising a first movable base movable in a horizontal plane in a first direction, a second movable base mounted on said first movable base and movable toward and away from a workpiece in the horizontal plane in a second direction transverse to said first direction, a support base mounted on said movable base, a spindle stock supported on said support base and rotatable about a center in a vertical plane, and a spindle device mounted on an outer end of said spindle stock at a position off said center.

It is therefore an object of the present invention to provide a machine tool which has reduced vertical dimensions and a lower center of gravity, and is lightweight through the elimination of vertical guide rails and a heavy cylinder unit for moving a spindle table along the guide rails.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 7 is a diagram showing, for comparison, areas machined by the machine tool of the invention and a conventional machine tool;

FIG. 8 is a front elevational view of a machine tool according to a second embodiment of the present invention;

DETAILED DESCRIPTION OF THE PREFERRED EMBODIMENTS

Figure 1:
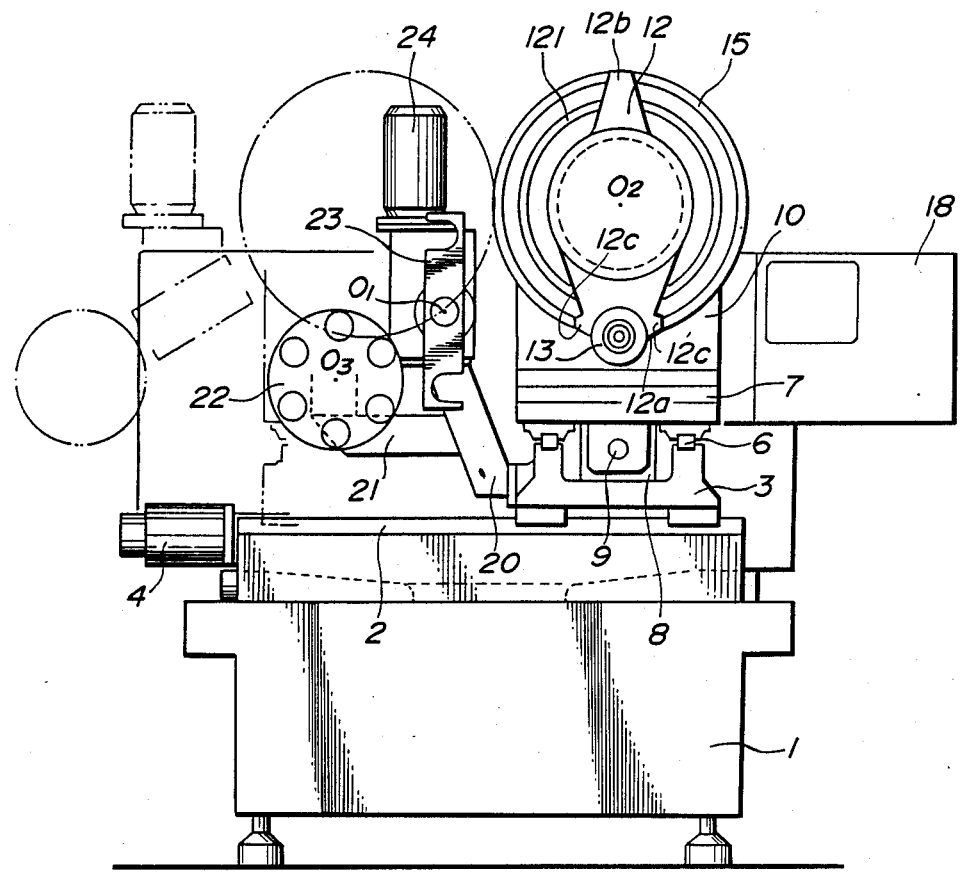
FIG. 1 is a front elevational view of a machine tool according to a first embodiment of the present invention.
Figure 2:
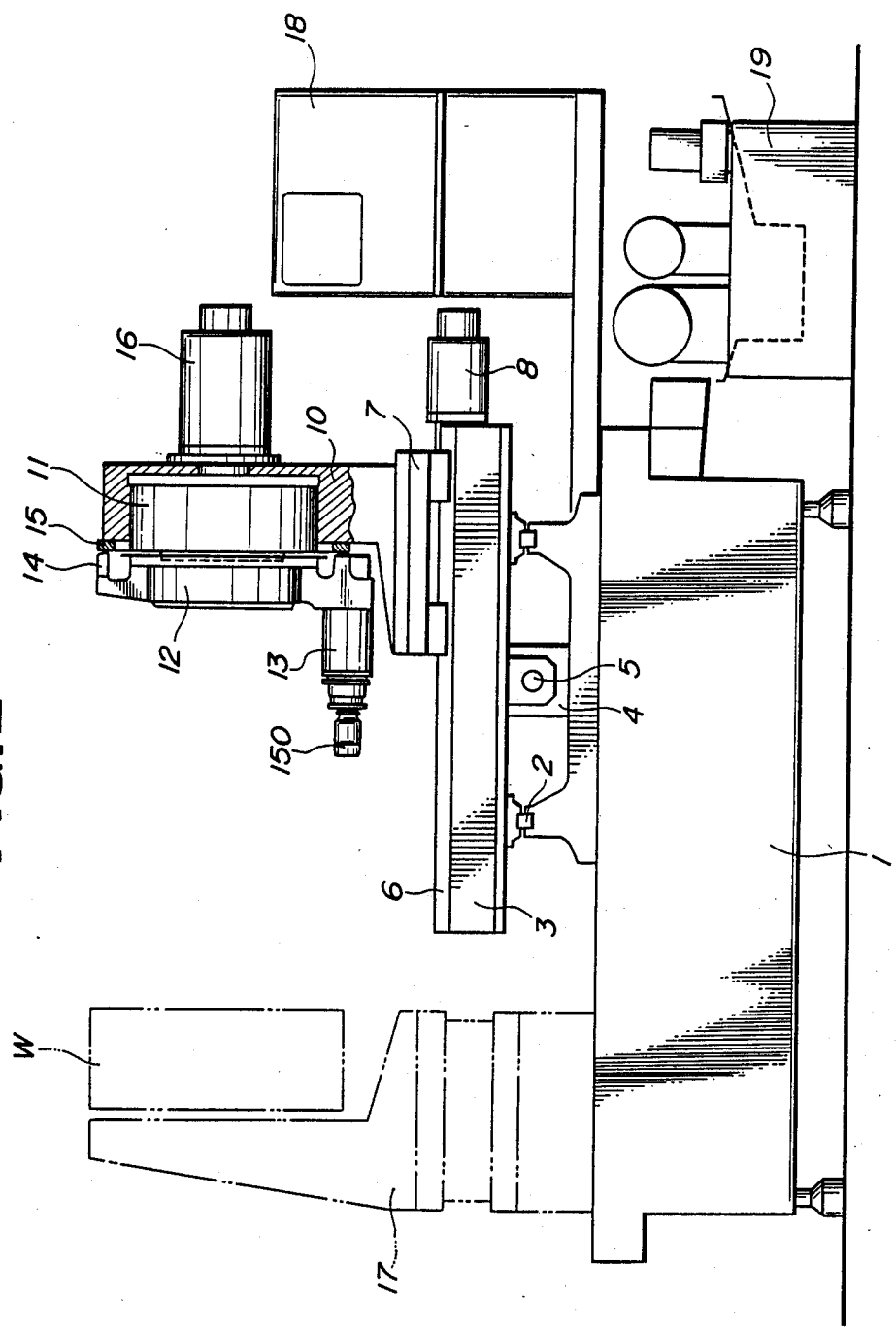
FIG. 2 is a side elevational view of the machine tool shown in FIG. 1.
Figure 3:
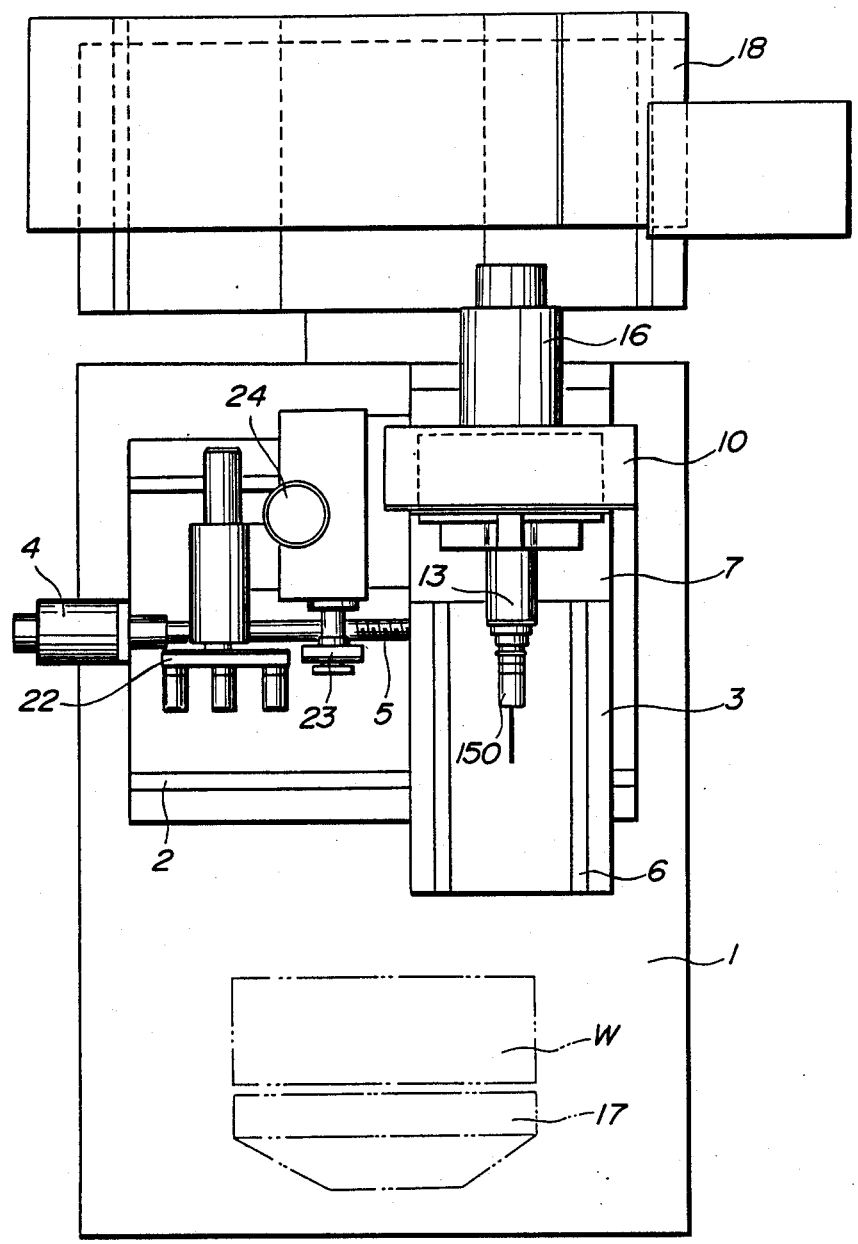
FIG. 3 is a plan view of the machine tool of FIG. 1.

As shown in FIGS. 1, 2, and 3, a bed 1 fixedly mounted on a floor supports transverse rails 2 and a motor 4 thereon. A ball screw 5 rotatable by the motor 4 is held in threaded engagement with a cross-slide table 3 slidably mounted on the rails 2. Therefore, the cross-slide table 3 can reciprocally move along the rails 2 by energizing the motor 4.

Rails 6 are mounted on an upper surface of the cross-slide table 3 in a direction normal to the rails 2. A feed table 7 is slidably mounted on the rails 6. The feed table 7 is held in threaded engagement with a ball screw 9 rotatable by a motor 8 fixedly mounted on the cross-slide table 3. Thus, by energizing the motor 8, the feed table 7 is reciprocally movable along the rails 6 in a horizontal plane in a direction normal to the direction in which the cross-slide table 3 is movable, i.e., in a direction toward and away from a workpiece.

An upright spindle stock support base 10 is mounted on the feed table 7. A spindle stock 12 comprising a turn arm is rotatable in a vertical plane about its central axis by a motor 11 fixedly disposed in the support base 10. The turn arm 12 has one end 12a on which a single-shaft spindle device 13 is mounted. A slidable member 14 is attached to the rear surfaces of opposite sides 12c of the arm 12, one on each side of the spindle device 13, and the other end 12b of the arm 12. A support ring 15 held against the slidable member 14 is attached to the front surface of the support base 10 around the motor 11. During a machining process, the turn arm 12 which is fixed by a fixing device 122 (described later on) with the other end 12b urged rearwardly is prevented from falling back by the support ring 15.

The spindle shaft of the spindle device 13 is rotated by a spindle motor 16 mounted on the rear surface of the support base 10. A fixing base 17 for supporting a workpiece W to be machined by the spindle device 13 is mounted on the bed 1 forwardly of the spindle stock 12. A control box 18 having a control panel is mounted on the bed 1 rearwardly of the spindle stock 12. A coolant unit 19 is disposed on the floor below the control box 18.

As shown in FIG. 1, a support arm 20 extends obliquely upwardly from the cross-slide table 3, and a branch arm 21 extends horizontally from an intermediate portion of the support arm 20. A tool magazine 22 is supported on the distal end of the branch arm 21 so as to be rotatable in a vertical plane substantially parallel to the plane in which the turn arm 12 is rotatable. The tool magazine 22 holds a plurality of different tools at equally spaced angular positions on its outer periphery. To the distal end of the support arm 20, there is attached a tool changer arm 23 rotatable in a vertical plane substantially parallel to the plane in which the turn arm 12 is rotatable, by a motor 24 disposed behind the tool changer arm 23. The tool magazine 22 and the tool changer arm 23 may be supported on the feed table 7.

The tool changer arm 23 is rotatable about a center 01 positioned on a straight line connecting a center 02 about which the turn arm 12 is rotatable and a center 03 about which the tool magazine 22 is rotatable. This arrangement makes it possible to minimize the length of the tool changer arm 23.

Figure 4:
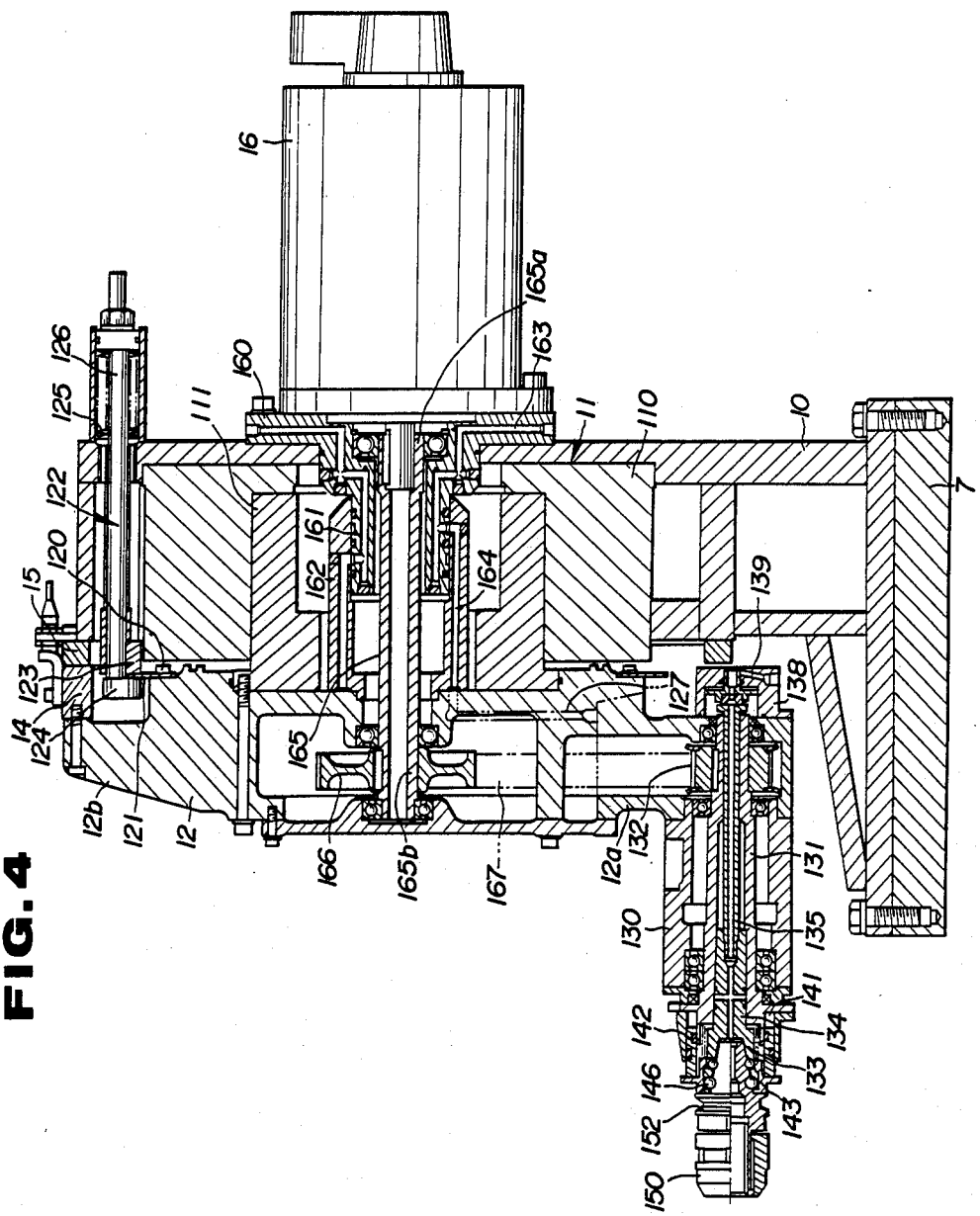
FIG. 4 is an enlarged vertical cross-sectional view of a portion of the machine tool of FIG. 1.

The structures of the motor 11, the turn arm 12, and the spindle device 13 will now be described with reference to FIGS. 4 through 6.

The motor 11 comprises a direct-drive motor having a tubular or hollow rotatable shaft 111 disposed in a tubular fixed member 110 mounted in the spindle stock support base 10. The hollow rotatable shaft 111 has a front end on which the turn arm 12 is mounted. An annular disc 121 comprising a leaf spring or the like is fixed to the rear surface of the turn arm 12 by screws 120. The support base 10 supports thereon a fixing device 122 which clamps or sandwiches the annular disc 121 to fix the turn arm 12 in position. The fixing device 122 comprises a seat 123 bearing the rear surface of the disc 121 and a presser 124 which cooperates with the seat 123 in sandwiching the disc 121. The presser 124 is mounted on the distal end of a rod 126 which is normally urged by a spring 125 in a direction to sandwich the disc 121. By pushing the rod 126 forwardly against the bias of the spring 125, the disc 21 can be released to allow the turn arm 12 to rotate. While the turn arm 12 is being fixed in position, the slidable member 14 on the rear surfaces of the sides 12c and the end 12b of the turn arm 12 is pressed against the support ring 15 on the front surface of the spindle stock support base 10.

The spindle motor 16 is mounted on the rear surface of the support base 10 by a seat 160 having a central tubular member 161 projecting forwardly into the hollow output shaft 111 of the turn motor 11. The tubular member 161 is inserted in a tubular coolant joint 162 attached to a rear central surface of the turn arm 12, the tubular coolant joint 162 being rotatable with respect to the tubular member 161. The seat 160, the tubular member 161 thereof, and the coolant joint 162 define therein coolant passages 163, 164 communicating with each other.

The spindle motor 16 is coupled to a spindle motor shaft 165 having a proximal end 165a rotatably supported in the tubular member 161 of the seat 160, the spindle motor shaft 165 being rotatable by the spindle motor 16 and extending through the hollow output shaft 111 of the motor 11. The spindle motor shaft 111 has a distal end 165b rotatably supported in the turn arm 12. A pulley 166 is mounted on the distal end 165b of the spindle motor shaft 165. A timing belt 167 is trained around the pulley 166 and a pulley 132 mounted on a spindle shaft 131 of the spindle device 13 for transmitting rotative power of the spindle motor 16 to the spindle device 13. The turn arm 12 also has a coolant passage 127 defined therein in communication with the coolant passage 164 in the coolant joint 162.

Figure 5:
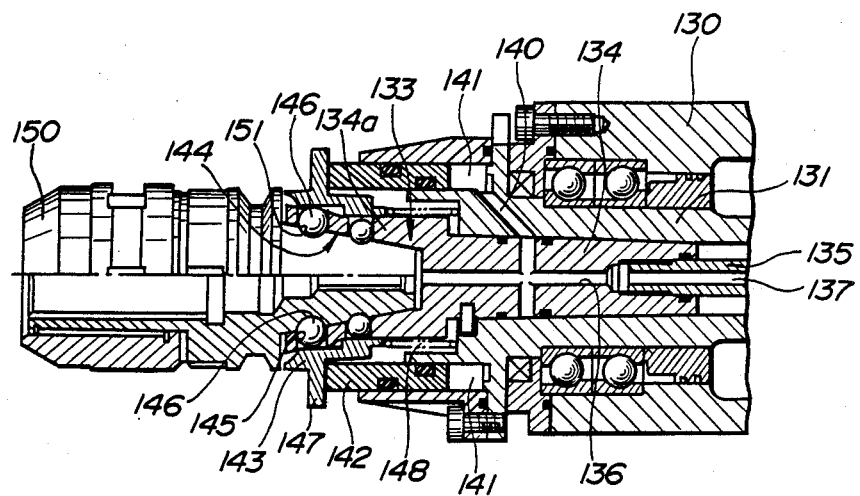
FIGS. 5 and 6 are enlarged fragmentary crosssectional views of a spindle device.
Figure 6:
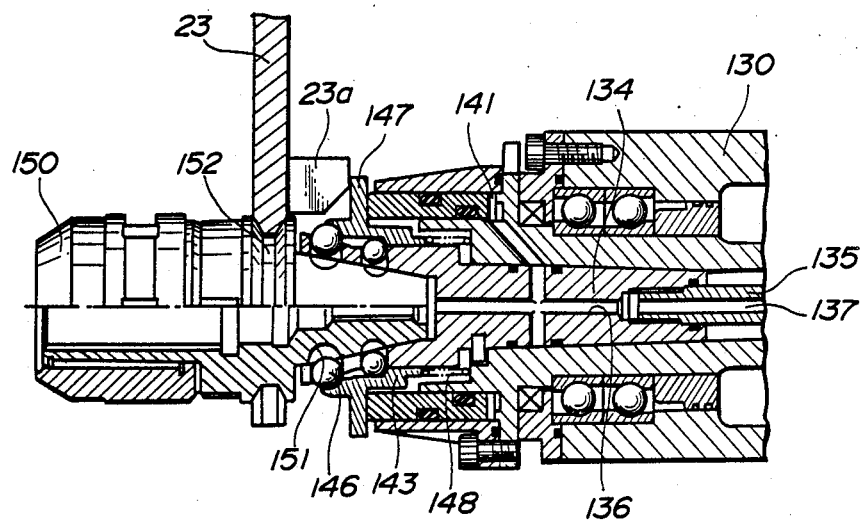

As also shown in FIG. 5 at an enlarged scale, the spindle device 13 has a case 130 fixed to the turn arm 12 and projecting forwardly therefrom, and the spindle shaft 131 is rotatably supported in the case 130. The spindle shaft 131 houses therein a main body 134 of a chuck unit 133 and the coolant joint 135. The coolant joint 135 has a rear end extending into a rotary joint 138 mounted on the rear surface of the turn arm 12.

The chuck unit main body 134 and the coolant joint 135 define coolant passages 136, 137 respectively therein. The coolant passage 137 communicates with a passage 139 defined in the rotary joint 138 and the passage 127 in the turn arm 12 through a tube (not shown). The coolant passage 136 communicates with an annular liquid chamber 141 defined in the front end of the spindle shaft 131 through a passage 140 defined in the spindle shaft 131. An annular piston 142 is slidably disposed in the annular liquid chamber 141.

The chuck unit 133 comprises the main body 134 and an outer tube 143 fitted over the main body 134 at its distal end portion 134a. The distal end portion 134a has a conical taper recess 144 defined therein and spreading outwardly in the forward direction, and radial through holes 145 retaining steel balls 146 respectively therein. The outer tube 143 has a flange 147 and is normally urged to move forwardly by a spring 148.

The outer tube 143 is also normally urged to move forwardly by the annular piston 142. More specifically, the liquid chamber 141 in the spindle shaft 131 is supplied with a portion of a coolant liquid from the coolant unit 19 through the passages 163, 164, 127, 139, 137, 136, 140 to push the piston 142 in the forward direction under the pressure of the coolant liquid. Therefore, the outer tube 143 is forcibly pushed forwardly under the resilient forces of the spring 148 and the liquid pressure developed in the liquid chamber 141 to push the steel balls 146 into holes 151 defined in a tapered portion of a tool holder 150 for thereby retaining the tool holder 150 in the chuck unit 133.

For machining the workpiece W, e.g., tapping the workpiece W, the workpiece W is fixed to the fixing base 17, and the motors 4, 8, 11 are energized to cause the spindle device 13 to reach a position where the workpiece W is to be machined. Lateral movement of the spindle device 13 is effected by energizing the motor 4, movement of the spindle device 13 toward and away from the workpiece W by energizing the motor 8, and vertical movement of the spindle device 13 by energizing the motor 11. When the motor 11 is energized, the turn arm 12 is rotated to move the spindle device 13 laterally. The distance of such lateral movement of the spindle device 13 is calculated in advance, and the distance of movement effected by the motor 4 is adjusted by the calculated distance of the lateral movement of the spindle device 13.

A tool is held by the tool holder 150 at all times. The tool holder 150 with the tool can be exchanged between the tool magazine 22 and the spindle device 13 in a position in which the center of the spindle device 13 lies on the line connecting the centers 02, 03 after the turn arm 12 has turned clockwise from the position of FIG. 1, i.e., a position in which the chuck unit 133 of the spindle device 13 is closest to the tool magazine 22. Since the tool is replaced in the position the spindle device 13 is closest to the tool magazine 22 after the turn arm 12 has turned, the tool changer device is small in size and tools can be changed quickly.

To remove the tool holder 150 from the chuck unit 133, the tool changer arm 23 is fitted in a groove 152 in the tool holder 150. A cam 23a of the tool changer arm 23 is held against the flange 147 of the outer tube 143 to push the outer tube 143 rearwardly against the bias of the spring 148, thereby allowing the steel balls 146 to be displaced out of the holes 151 of the tool holder 150. The tool holder, 150 is now pulled out forwardly. Then, a new tool holder 150 is angularly moved with the arm 23 into the position aligned with the chuck unit 133, and loaded into the chuck unit 133 in a process which is a reversal of the above removal process.

FIG. 7 shows, for comparison, an area that can be machined by the machine tool of the present invention and an area machinable by a conventional machine tool, provided that the amounts of vertical movement (circular movement in the present invention and linear movement in the conventional machine tool) of the spindle shafts remain the same, and that the amounts of lateral movement of the spindle stocks remain the same. A review of FIG. 7 clearly indicates that the machine tool of the invention can increase the machinable area by lateral semicircular zones followed by the turn arm 12.

FIGS. 8 through 14 show a machine tool according to a second embodiment of the present invention. The second embodiment primarily differs from the first embodiment in that a spindle stock is constructed as a disc-shaped turntable.

Figure 9:
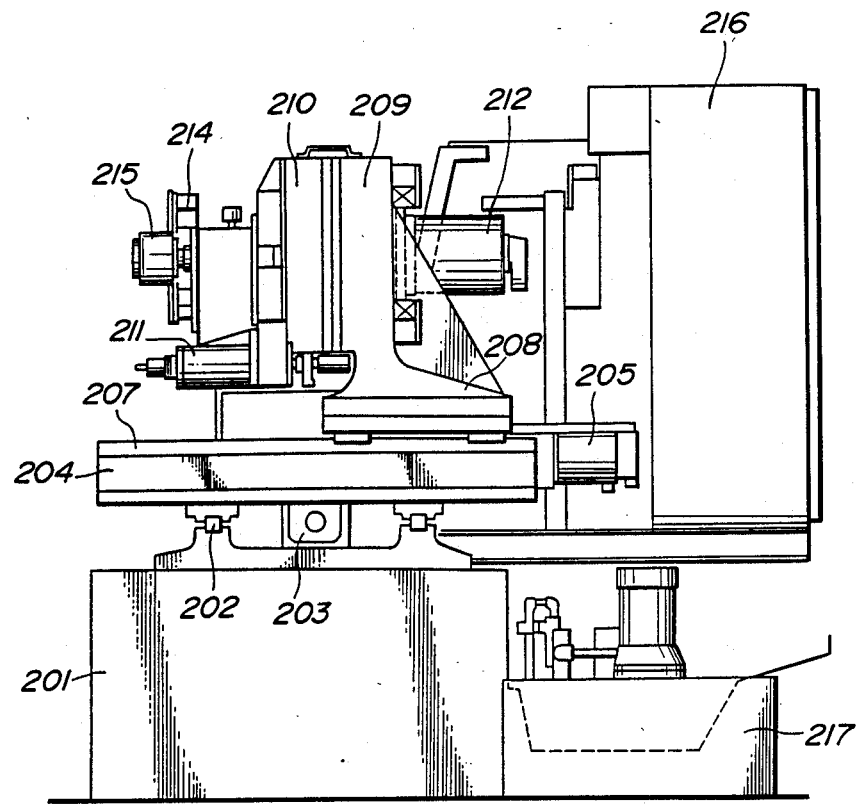
FIG. 9 is a side elevational view of the machine tool shown in FIG. 8.
Figure 10:
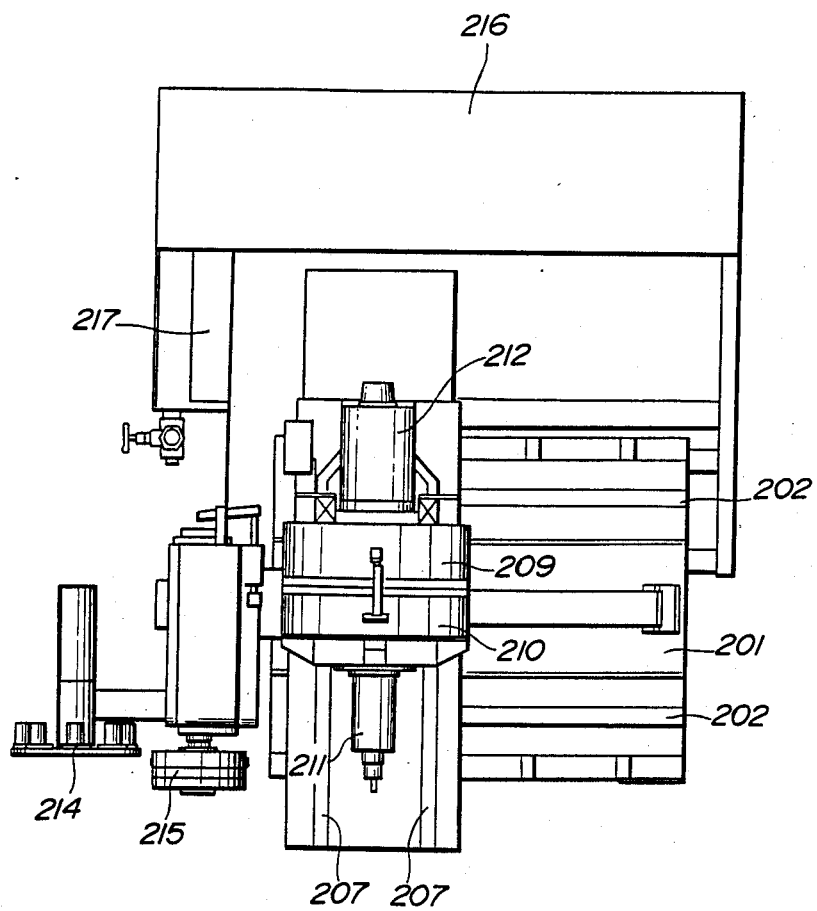
FIG. 10 is a plan view of the machine tool of FIG. 8.
Figure 11:
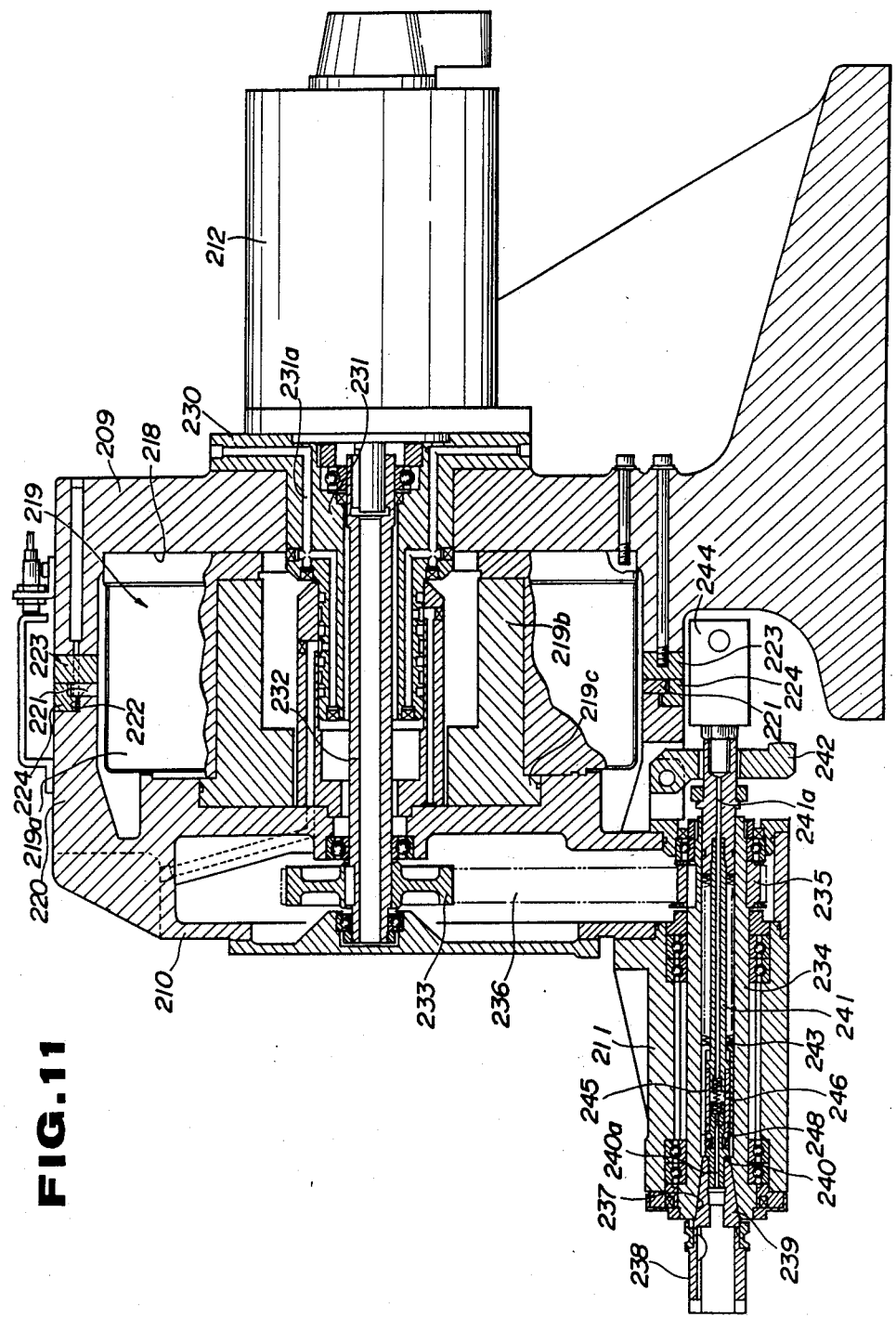
FIG. 11 is a vertical cross-sectional view of a support body and a turntable of the machine tool shown in FIG. 8.

As illustrated in FIGS. 8, 9, and 10, guide rails 202 are mounted laterally on a bed 201 fixed to a floor, and a movable base 204 movable by a motor 203 is mounted on the guide rails 202. The movable base 204 supports guide rails 207 thereon on which a movable base 208 is mounted, the movable base 208 being movable in a direction toward and away from a workpiece (not shown) by a motor 205. A spindle stock support base 209 is mounted on the movable base 208.

A spindle stock 210 comprising a turntable rotatable in a vertical plane by a motor disposed in the support base 209 is disposed on the front surface of the support base 209. A spindle device 211 is mounted on the front surface of the turntable 210 in a position off the center of turning movement of the turntable 210. The spindle device 211 is rotatable by a motor 212 attached to the rear surface of the support base 209.

An arm 213 extends obliquely upwardly from the movable base 204, and a ,tool magazine 214 which holds tools is attached to the distal end 213a of the arm 213. A tool changer unit 215 for changing tools between the tool magazine 214 and the spindle device 211 is mounted on an intermediate portion 213b of the arm 213. A control box 216 is mounted on the bed 201 rearwardly of the support base 209, and a coolant unit 217 is disposed on the floor behind the bed 201. The tool magazine 214 and the tool changer unit 215 may be supported on the movable base 208.

The structural details of the support base 209 and the turntable 210 will be described with reference to FIGS. 11 through 14.

The support base 209 has a recess 218 opening forwardly (to the left in FIG. 11) in which there is disposed a direct-drive motor 219 for rotating the turntable 210 in a vertical plane. The motor 219 comprises a tubular fixed member 219a and a hollow rotatable shaft 219b supported in the tubular fixed member 219a, the turntable 210 being fixed to the distal end 219c of the hollow rotatable table 219b.

The turntable 210 is of a disc shape when viewed in front elevation, and is of a hollow construction including an annular rib 220 projecting rearwardly from the rear surface of an outer periphery thereof.

The annular rib 220 has a rear end either including a slidable ring 221 or against which a slidable ring 221 is held, with a groove 222 being defined between the slidable ring 221 and the annular rib 220. A support ring 223 is fixed to the front surface of, the support base 209 and held in full slidable contact with the slidable ring 221. An engaging ring 224 of an angle-shaped cross section is attached to the front surface of the support ring 223. By putting the engaging ring 224 in the groove 222, the slidable ring 221 is interposed between the engaging ring 224 and the support ring 223 while leaving a gap which allows the slidable ring 221 to slide therein. Since the annular rib 220 is disposed on the rear surface of the turntable 210 and the end face of the annular rib 220 is borne by the support ring 223 on the front surface of the support base 209, the rigidity of the turntable 210 is increased and the axis of the spindle device 211 is prevented from being displaced or vibrated during a machining operation.

Figure 12:
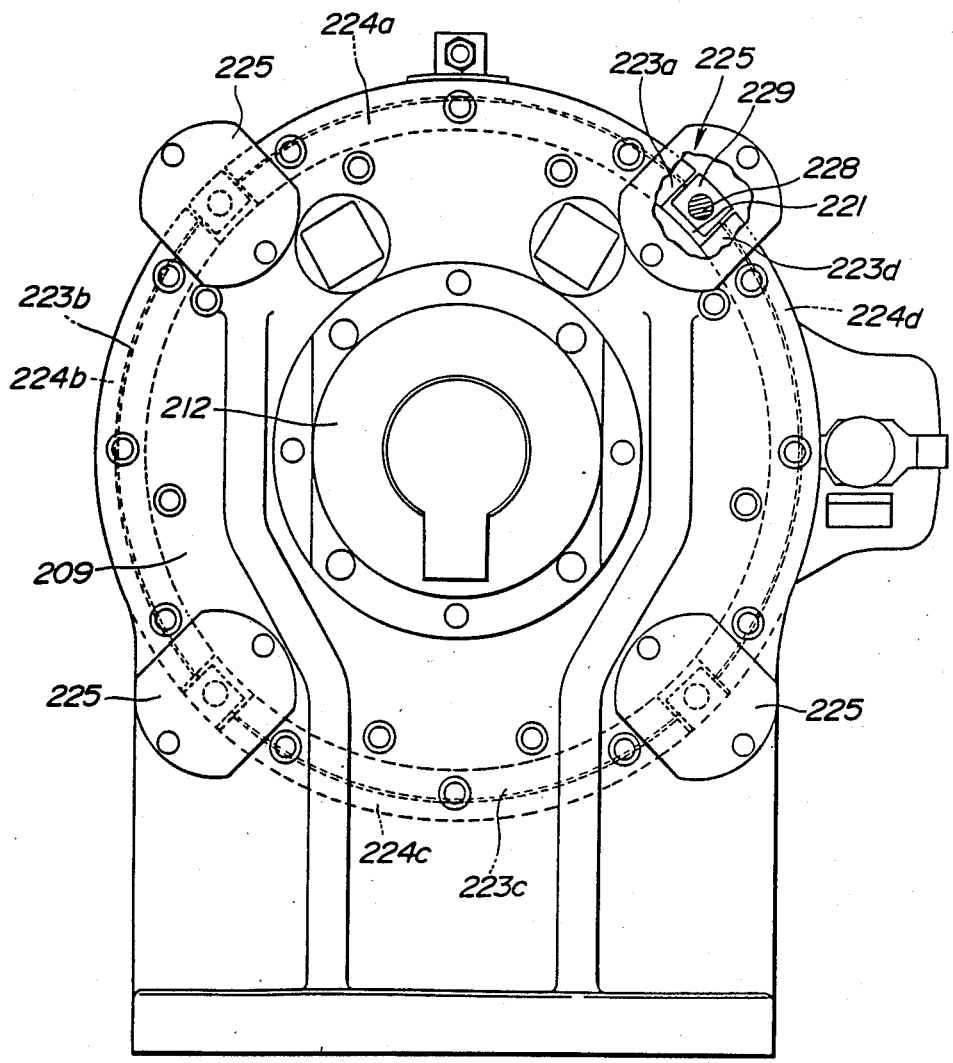
FIG. 12 is a rear elevational view of the support body.

The support ring 223 and the engaging ring 224 are not of a complete annular shape. As shown in FIG. 12, the support ring 223 and the engaging ring 224 are divided into four support rings 223a, 223b, 223c, 223d and four engaging rings 224a, 224b, 224c, 224d, respectively, and fixing or clamping mechanisms 225 are disposed respectively in spaces defined between the ends of these support rings 223a, 223b, 223c, 223d and engaging rings 224a, 224b, 224c, 224d.

Figure 13:
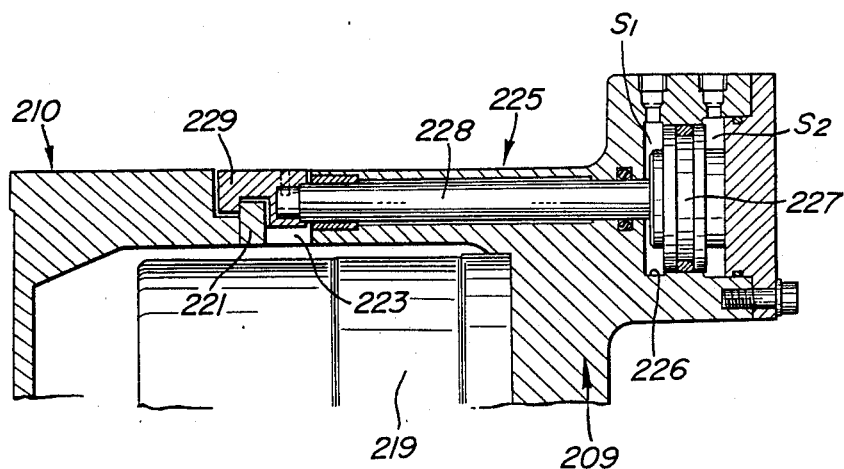
FIG. 13 is a cross-sectional view of a fixing device.

The fixing mechanisms 225 comprise four cylinders 226, respectively, on an outer periphery of the rear surface of the support base 209. As shown in FIG. 13, each of the cylinders 226 houses a piston 227 slidably therein. The piston 227 divides the interior space of the cylinder 226 into chambers S1, S2. The piston 227 is fixed to a 23 piston rod 228 extending through the support base 209 and having a distal end to which a clamping finger 229 is fixed for engaging the slidable ring 221. When air or working oil is supplied into the chamber S1, the piston rod 228 and the clamping finger 229 are moved to the right in FIG. 13 to press the slidable ring 221 against the front surface of the support ring 223 for fixing the turntable 210 in a desired angular position. During a machining process, since the turntable 210 is firmly secured to the support base 209, the axis of the spindle device 211 is not displaced or vibrated under machining resistance to the tool irrespective of the position in which the spindle device 211 may be stopped, so that the workpiece can be accurately machined.

The fixing mechanisms 225 are not operable dependent on cutting conditions. For example, when a workpiece is drilled or tapped to form a small-diameter hole or similarly machined under a relatively small machining force, the force acting on the spindle device 211 is small. Since the turntable 210 which is substantially integral with the spindle device 211 is clamped substantially over its entire circumference between the engaging ring 224 and the support ring 223 through the slidable ring 221, the turntable 210 remains in the vertical plane and the spindle device 211 is not displaced. Accordingly, the fixing mechanisms 225 are not required to be operated, and the supply of fluid pressure which would otherwise be needed to operate the fixing mechanisms 225 can be dispensed with. The turntable 210 can accurately be stopped in an angular position by the motor 219.

The spindle motor 212 for driving the spindle device 211 is mounted on the rear surface of the support base 210 by a seat 230 having a front tubular member 231 in which a spindle motor shaft 232 is rotatably supported. A pulley 233 is mounted on the distal end of the spindle motor shaft 232 which projects into a hollow space in the turntable 210. A timing belt 236 is trained around the pulley 233 and a pulley 235 mounted on a hollow spindle shaft 234 of the spindle device 211 for transmitting rotative power from the spindle motor 212 to the spindle shaft 234.

The distal end of the spindle shaft 234 includes a female taper member 237 in which a male taper member 239 of a tool holder 238 is fitted. A chuck member 240 is threadedly mounted in the male taper member 239.

A drawbar 241 for attaching and detaching the tool holder 238 is inserted in the spindle shaft 234. The drawbar 241 is movable back and forth against and under the bias of a spring 243 by a drawbar operating arm 242 which is operated in conjunction with the tool changer unit 215. A rotary joint 244 for supplying a cutting liquid is attached to the rear end of the drawbar 241. A cutting liquid is supplied to a tool through a passage 231a defined in the tubular member 231, the rotary joint 244, a passage 241a in the drawbar 241, a passage 240a in the chuck member 240, and the tool holder 238.

Figure 14:
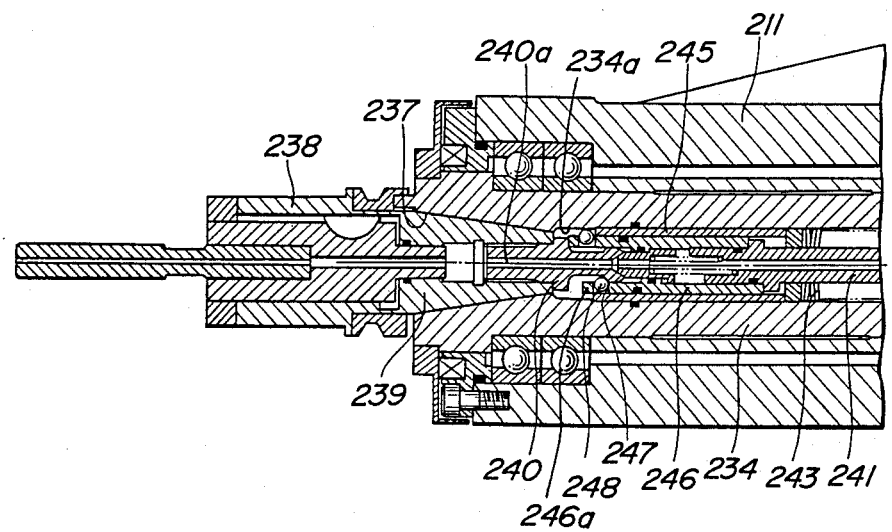
FIG. 14 is a cross-sectional view showing a tool catching action of a spindle device.

As illustrated in FIG. 14, the spindle shaft 234 houses therein an outer tube 245 fixed to the inner peripheral surface 234a of the spindle shaft 234, and an inner tube 246 slidably held in the outer tube 245 and threaded in the distal end of the drawbar 241. The inner tube 246 includes a front portion having radial through holes 247 defined therein and accommodating steel balls 248 respectively therein. When the drawbar 241 is pulled to the right in FIG. 14 under the resiliency of the spring 243, the inner tube 246 is also moved to the right as indicated by the lower half of FIG. 14 to cause the steel balls 248 to be pushed radially inwardly by the inner peripheral surface of the outer tube 245, thereby gripping the chuck member 240 radially inwardly. When the drawbar 241 is pushed to the left by the drawbar operating arm 242, the steel balls 248 are displaced radially outwardly out of the outer tube 245 as indicated by the upper half of FIG. 14, thus releasing the chuck member 240. The tool is now replaced with a new one.

With the present invention, as described above, the vertical position of the mounted tool is adjusted by rotating the spindle stock. Therefore, any vertical rails and any cylinder units above such guide rails are not required, and the machine tool has a reduced height and a lowered center of gravity.

The spindle stock is rotated by a motor having a hollow shaft, and the spindle motor shaft for transmitting rotative power of the spindle motor to the spindle device is disposed in the hollow shaft. Accordingly, the overall dimensions of the machine tools are reduced.

Although present invention has been described with respect to current preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A machine tool comprising:
a first movable base movable in a horizontal plane in a first direction;
a second movable base mounted on said first movable base and movable toward and away from a workpiece in the horizontal plane in a second direction transverse to said first direction;
a support base mounted on said second movable base,
a spindle stock supported on said support base and rotatable about a center in a vertical plane; and
a spindle device mounted on an outer end of said spindle stock at a position off said center;
said support base including an annular support member disposed on a front surface thereof coaxially with said center;
said spindle stock having a slidable member held in slidable contact with said annular support member; and
said spindle stock comprises an arm including a rear surface said slidable member being disposed on at least said rear surface of said arm on each side of said spindle device.

2. A machine tool comprising:
a first movable base movable in a horizontal plane in a first direction;
a second movable base mounted on said first movable base and movable toward and away from a workpiece in the horizontal plane in a second direction transverse to said first direction;
a support base mounted on said second movable base, said support base having a front surface;
a spindle stock supported on said support base and rotatable about a center in a vertical plane; and
a spindle device mounted on an outer end of said spindle stock at a position off said center;
said support base includes an annular support member disposed on said first surface coaxially with said center;
said spindle stock having a slidable member held in slidable contact with said annular support member;
said support base includes clamp means for engaging said slidable member of said spindle stock, and an operating mechanism for operating said clamp means to press said slidable member against said annular support means to fix said spindle stock to said support base in a prescribed angular position.

3. A machine tool comprising:
a first movable base in a horizontal plane in a first direction;
a second movable base mounted on said first movable base and movable toward and away from a workpiece in the horizontal plane in a second direction transverse to said first direction;
a support base mounted on said second movable base;
a spindle stock supported on said support base and rotatable about a center in a vertical plane; and
a spindle device mounted on an outer end of said spindle stock at a position off said center;
said support base includes a first motor disposed therein for rotating said spindle stock and a second motor mounted on a rear surface thereof for rotating said spindle device, said first motor having a first hollow output shaft with a front end coupled to said spindle stock, said second motor having a second hollow shaft extending axially through said first hollow output shaft.

4. A machine tool comprising:

a first movable base movable in a horizontal plane in a first direction;

a second movable base mounted on said first movable base and movable toward and away from a workpiece in the horizontal plane in a second direction transverse to said first direction;

a support base mounted on said second movable base;

a spindle stock supported on said support base and rotatable about a center in a vertical plane; and a spindle device mounted on an outer end of said spindle stock at a position off said center;

said support base includes a first motor disposed therein for rotating said spindle stock and a second motor mounted on a rear surface thereof for rotating said spindle device, said first motor having a first hollow output shaft with a front end coupled to said spindle stock, said second motor having a second hollow shaft extending axially through said first hollow output shaft;

said spindle device includes a spindle shaft, said spindle shaft and said second output shaft of said second motor being coupled to each other by a power transmission mechanism disposed in said spindle stock.

5. A machine tool comprising:

a first movable base movable in a horizontal plane in a first direction;

a second movable base mounted on said first movable base and movable toward and away from a workpiece in the horizontal plane in a second direction transverse to said first direction;

a support base mounted on said second movable base;

a spindle stock supported on said support base and having an axis of rotation to be rotatable about a center in a vertical plane; and a spindle device mounted on an outer end of said spindle stock at a position off said center;

said spindle device includes chuck means on a distal end thereof, further including a tool magazine and tool changer means supported on said first movable base or said second movable base;

said tool magazine having an axis of rotation;

said tool changer means having means for changing tools between said chuck means and said tool magazine in a position in which said chuck means is closest to said tool magazine among various positions of said chuck means around said axis of rotation of said spindle stock, said tool magazine being rotatable in a vertical plane substantially parallel to the plane in which said spindle stock is rotatable.

6. A machine tool comprising:

a first movable base movable in a horizontal plane in a first direction;

a second movable base mounted on said first movable base and movable toward and away from a workpiece in the horizontal plane in a second direction transverse to said first direction;

a support base mounted on said second movable base;

a spindle stock supported on said support base and rotatable in a vertical plane; and a spindle device mounted on an outer end of said spindle stock;

said spindle device includes chuck means on a distal end thereof and further includes a tool magazine and tool changer means which are supported on said first movable base or said second movable base, each of said spindle stock and tool magazine having an axis of rotation;

said tool changer means having means for changing tools between said chuck means in a position in which said chuck means is located in a straight line connecting said axis of rotation of said spindle stock and said axis of rotation of said tool magazine.

7. A machine tool according to claim 2, wherein said spindle stock is substantially disc-shaped, said slidable member being of an annular shape and held fully against said annular support member of said support base.

* * * * *